United States Patent [19]

Engel-Bader et al.

[11] Patent Number: 5,116,938
[45] Date of Patent: May 26, 1992

[54] PROCESS FOR PRODUCING THE POLYESTER POLYETHYLENE TEREPHTHALATE (PET) FROM A LOWER DIALKYL ESTER OF A DICARBOXYLIC ACID AND A GLYCOL USING A SPECIFIC CATALYST SYSTEM

[75] Inventors: Monika Engel-Bader, Charlotte, N.C.; Bobby N. Furr, Fort Mill, S.C.

[73] Assignee: Hoechst Celanese Corporation, Somerville, N.J.

[21] Appl. No.: 557,831

[22] Filed: Jul. 26, 1990

Related U.S. Application Data

[62] Division of Ser. No. 425,540, Oct. 23, 1989, abandoned.

[51] Int. Cl.$^5$ .................. C08G 63/00; C08G 63/02; C08G 63/78; C08G 63/82
[52] U.S. Cl. ........................ 528/272; 528/176; 528/275; 528/277; 528/280; 528/285
[58] Field of Search ............... 528/176, 272, 275, 277, 528/280, 285

[56] References Cited

U.S. PATENT DOCUMENTS

| | | | |
|---|---|---|---|
| 3,657,180 | 4/1972 | Cohn et al. | 528/280 |
| 3,709,859 | 1/1973 | Hrach et al. | 528/285 |
| 3,907,754 | 9/1975 | Tershansy et al. | 528/280 |
| 3,962,189 | 6/1976 | Russin et al. | 528/280 |
| 4,010,145 | 3/1977 | Russin et al. | 528/280 |

Primary Examiner—John Kight, III
Assistant Examiner—T. Mosley
Attorney, Agent, or Firm—Gregory N. Clements

[57] ABSTRACT

A novel catalyst composition, and a process for using the novel catalyst system to produce polyester is described. The novel catalyst composition is specific for producing polyester from a lower dialkyl ester of a dicarboxylic acid and glycol, wherein the catalyst composition includes from about 20 ppm to about 150 ppm manganese; from about 50 ppm to about 250 ppm lithium; from about 10 ppm to about 40 ppm cobalt; and from about 200 ppm to about 400 ppm antimony, all amounts being based upon the expected yield of the polyester. The process for using the novel catalyst composition to make polyester includes the step of employing an effective catalytic amount of manganese and lithium in an ester interchange reaction from a lower dialkyl ester of a dicarboxylic acid and glycol to produce monomer; and using an effective catalytic amount of cobalt and antimony in the polycondensation reaction to convert the monomer to polyester. Using the novel catalyst composition or novel process to produce polyester drastically increases both the ester interchange rate and the polymerization rate, such that the ester interchange time and the polycondensation time are drastically reduced as compared to more conventional systems for producing polyester.

14 Claims, No Drawings

PROCESS FOR PRODUCING THE POLYESTER POLYETHYLENE TEREPHTHALATE (PET) FROM A LOWER DIALKYL ESTER OF A DICARBOXYLIC ACID AND A GLYCOL USING A SPECIFIC CATALYST SYSTEM

This is a division of application Ser. No. 07/425,540 filed Oct. 23, 1989, now abandoned.

BACKGROUND OF THE INVENTION

1) Field of the Invention

The present invention relates to a process for producing the polyester polyethylene terephthalate (PET) from a lower dialkyl ester of a dicarboxylic acid and a glycol using a specific catalyst system which improves not only the ester interchange time but also the polymerization time. In particular, the catalyst system comprises manganese, lithium, cobalt and antimony. More specifically, manganese and lithium are used as catalysts for the ester interchange while cobalt and antimony are used as catalysts for the polycondensation stage.

2) Prior Art

The catalyst system of the present invention is specific for manufacturing PET from the starting materials of a lower dialkyl ester of a dicarboxylic acid (LDE) such as dimethyl terephthalate (DMT) and glycol, such as ethylene glycol. More specifically, DMT and ethylene glycol are typically reacted in the presence of a catalyst (manganese) at atmospheric pressure and at a temperature of from about 180° C. to 230° C. In the presence of a suitable catalyst, these components undergo ester interchange to yield bis (2-hydroxyethyl) terephthalate or "monomer" and methanol. The reaction which is conventionally done with 1 mole of DMT and 2 to 2.4 moles of ethylene glycol is reversible and is carried to completion by removing the methanol formed. During the ester interchange, the monomer is the substantial majority product (not considering the methanol) along with small amounts of low molecular weight polymers and unreacted components.

The monomer is then polymerized where the temperature is raised to about 280° C. to 310° C. and the pressure is reduced to below 1 mm of mercury vacuum and in the presence of a suitable polymerization catalyst (antimony). From this reaction, polyethylene terephthalate (PET) and ethylene glycol are formed. Because the reaction is reversible, the glycol is removed as it is evolved, thus forcing the reaction toward the formation of the polyester. This known process is described in U.S. Pat. No. 4,501,878 to Adams.

Manganese is the preferred catalyst for ester interchange reactions, but the amount of manganese employed must be strictly controlled. The presence of too litle manganese during the ester interchange reaction results in very long reaction times, while the presence of too much manganese results in unwanted side products during the polycondensation reaction (thus lowering the yield of monomer), and unacceptable degradation of the polymer resulting in poor color (thus lowering the quality). The exact range of manganese which proves to be the most desirable must generally be determined through trial and error because many factors affect the reactivity of the manganese. For example, reaction temperature, reaction pressure, the degree of mixing during reaction, the purity of the raw materials, the presence of other additives, etc., all affect the effectiveness of manganese.

In prior art processes, manganese was employed to obtain suitable ester interchange reaction times, but the manganese had to be sequestered after ester interchange or during polycondensation by a polyvalent phosphorous compound to aid in reducing the discoloration and unwanted side products. Generally, prior art processes employed about 50 ppm to 150 ppm manganese based on the expected yield of the polymer, as the ester interchange catalyst. Using more than about 150 ppm manganese resulted in polymer degradation even if phosphorous was employed in excess to sequester the manganese. It is believed that this occurred because the phosphorous was incapable of complexing with the manganese to the degree necessary to prevent discoloration.

U.S. Pat. No. 3,709,859 to Hrach et al discloses a multi-component catalyst system for producing polyester. Among the many catalysts mentioned are lithium, cobalt, manganese and antimony. Although these catalysts are set forth in the background portion of the patent, the patent claims a catalyst system comprising antimony, lead, and calcium, and additionally strontium or barium. Hrach et al also teach the necessity of employing pentavalent phosphorous compounds as stabilizers in order to prevent the formation of discolored polyester.

U.S. Pat. No. 3,657,180 to Cohn discloses a process for making polyester resin in which lithium or a divalent metal compound are employed as catalyst during the production. The specification states that manganese may be one of the divalent metallic compounds which can be employed. The order of mixing the various raw materials and the addition of the compounds to the process described in this invention is stated to be critical. The process is carried out by reacting DMT and ethylene glycol in the presence of a lithium salt under ester interchange conditions followed by the addition of manganese. The process also includes using manganese as a catalyst with lithium being added after the ester interchange reaction. In either case, the second metal is always added after ester interchange, and thus is not used as a catalyst. Moreover, the second metal is always added in a non-catalytic amount. The second metal is added to provide slip for polyester film and the amount added is several factors larger than catalytic amounts.

British Patent 1,417,738 to Barkey et al discloses a process for manufacturing polyester in which a preferred ester interchange catalysts may include zinc, manganese, cobalt, and lithium, among others. Preferred polycondensation catalysts include antimony compounds. This reference, however, claims other catalyst compounds and mentions the above catalyst only as background information.

Various patents assigned to Eastman Kodak Company (British Patents 1,417,738, and 1,522,656; U.S. Pat. Nos. 3,907,754, 3,962,189, and 4,010,145) disclose a broad variety of catalyst systems, including a manganese, cobalt, lithium and titanium combination and a manganese, titanium, cobalt and antimony catalyst system, with phosphorous being used in each of these systems as a sequestering agent. Each of these catalysts was added at the beginning of ester interchange. Although these catalyst systems would generally reduce the overall time required to process the raw materials into polyester, because the ester interchange time was substantially improved; the polycondensation time was not substantially improved.

Improvements which reduce the ester interchange time, but not the polycondensation time, for example, are not particularly advantageous especially where different reactor vessels are employed for the ester interchange process and the polycondensation process. When different reactor vessels are employed, a reduction in only the ester interchange time, for example, does not necessarily reduce the total process time, because the total process is only as fast at the slowest stage in the process. Therefore, a reduction in time for one of the two stages may not improve the overall existing process. In such a situation, additional reactor vessels could be purchased for the slowest stage to improve the total process time, but this is an expensive solution.

There remains a need to develop a catalyst system and process which will reduce not only the ester interchange reaction time but also the polycondensation reaction time so that the totality of processing time is substantially reduced.

It is a further aim or aspect of the present invention to not only quickly produce a polyester, namely PET, from raw materials, but produce a polyester which has acceptable clarity, IV and color properties.

SUMMARY OF THE INVENTION

The present invention combines catalysts which are effective in the ester interchange reaction and catalysts which are effective in the polycondensation reaction and uses those catalysts in specific amounts and under a unique manner of introducing such catalysts to the polyester production process so as to yield not only an improvement in the ester interchange time, but also an improvement in the polycondensation time. In particular, the present invention comprises a catalyst system consisting of manganese and lithium to be used for the ester interchange reaction and the catalysts of cobalt and antimony to be employed in the polycondensation reaction.

In the broadest sense, the present invention relates to a catalyst system for making PET comprising 20 ppm to about 150 ppm manganese; 50 ppm to about 250 ppm lithium; 10 ppm to about 40 ppm cobalt; and 200 ppm to about 400 ppm antimony based upon the expected yield of the polyester. This catalyst system of the present invention, when used in the most effective amounts, increases the polymerization rate and the ester interchange rate thereby reducing both the ester interchange time and the polymerization time in at least the most preferred instances of approximately one-half of that required under control conditions.

In the broadest sense, the present invention also comprises a method for making PET polyester from a lower dialkyl ester of a dicarboxylic acid (LDE) and glycol comprising the steps of: reacting LDE with glycol at a temperature and pressure sufficient to produce monomer, and alcohol; removing the resultant alcohol to more completely react the LDE and glycol; polymerizing the resultant monomer to form PET polyester at a sufficient temperature and pressure; the improvement comprising adding a first catalyst system before the beginning of or during the ester interchange reaction comprising from about 20 ppm to about 150 ppm manganese and from about 50 ppm to about 250 ppm lithium; preferably sequestering the manganese by the addition of a sequestering agent; and adding a second catalyst system before the beginning of or during polymerization, comprising from about 10 ppm to about 40 ppm of cobalt and from about 200 ppm to about 400 ppm antimony, except that cobalt can be added only after substantial completion of the ester interchange reaction; wherein all amounts are based upon the expected yield of the polymer.

When stating that the manganese and lithium can be added at any time before or during ester interchange, it is intended to include the addition of the catalyst metals in the LDE, glycol, or other feedstock material streams. For example, all the ester interchange catalysts could be added into the glycol feed stream.

When stating that cobalt and antimony can be added at any time before or during polymerization, it is intended to include the fact that antimony can be added at any time, including with the other metal catalyst of manganese and lithium, in the LDE, glycol, or other feedstock material streams. Cobalt, on the other hand, must be added only after substantial completion of the ester interchange reaction. Thus, whether antimony is added in with other catalyst in the feedstock streams, or is added with the cobalt after the ester interchange reaction does not make any difference in the polymer produced.

In the broadest sense, the present invention also comprises a PET product made by the above-mentioned process.

DESCRIPTION OF THE PREFERRED EMBODIMENTS

Polyester of the present invention is prepared from lower dialkyl esters of a dicarboxylic acid (LDE) and glycol. Polyester of the present invention is polyethylene terephthalate (PET). Suitable lower alkyl esters of dicarboxylic acid include, but is not limited to, dimethyl terephthalate, diethyl terephthalate, etc. The glycol may comprise ethylene glycol, diethylene glycol, or mixtures of these. The present invention may be used to produce PET by either a continuous process or a batch process, both of which are well known in the art.

The catalyst system of the present invention comprises from about 20 ppm to about 150 ppm manganese; from about 50 ppm to about 250 ppm lithium; from about 10 ppm to about 40 ppm cobalt; and from about 200 ppm to about 400 ppm antimony, based upon the expected yield of the polyester. This catalyst system, when used in the most effective amounts, increased the ester interchange rate and polymerization rate, thereby reducing both the ester interchange time and the polycondensation time. In the most preferred embodiments of the present invention, the overall total process time may be reduced by approximately one-half over that of more conventional polyester production processes.

Although metals are described for the catalyst system of the present invention, the catalyst may be added in the form of many different compounds. For example, compounds such as oxides and acetates are the most preferred, while such organic and inorganic compounds as carbonates, phosphates (except manganese phosphates), halides, sulfides, amines, compounds of Group VI, etc., may also be employed. Preferably, manganese, lithium, and cobalt are added as catalysts in the form of acetates, while antimony is generally added in the form of antimony oxide. All catalyst compounds can also be used in the glycolized form by pre-reacting with glycol. When a catalyst is added in the form of a compound, the amount of compound added is determined by the amount of catalyst desired and the amount of catalyst available in the compound.

Other additives may be included in the general procedure outlined above, such as coloring agents, delustrants, opaquing agents, stabilizers, etc. These additives do not add or detract from the present invention.

In the process of the present invention, glycol and lower dialkyl esters of dicarboxylic acid are reacted either in a batch process or a continuous process at a temperature of between 150° C. to 250° C. at approximately atmospheric pressure in an ester interchange reaction to produce monomer and alcohol. The lower dialkyl ester, such as dimethyl terephthalate, and the glycol, such as ethylene glycol, are reacted in the presence of manganese and lithium and are generally reacted in a molar ratio of ethylene glycol to DMT, for example, of about 2/1 to about 2.4/1. The molar ratio may vary somewhat depending upon the efficiency of the overall process. Because the ester interchange reaction is reversible, it is necessary to remove the alcohol formed to assure that the reaction favors the formation of monomer. For example, when DMT is used, the alcohol formed is methanol which must be removed to favor the yield of monomer-bis (2-hydroxyethyl) terephthalate. The alcohol formed and the monomer formed depend upon the glycol employed and the lower dialkyl ester employed in the ester interchange reaction.

Generally, the ester interchange catalyst system is added with the raw materials as they are introduced into the reaction vessel. For example, the manganese and lithium may be a part of the LDE raw material feed stream or a part of the glycol feed stream. Moreover, if the feed stream would also include other additives such as colorants, delustrants, opaguing agents, etc., the catalyst for the ester interchange process (manganese and lithium) could be a part of the additive feed stream. The ester interchange catalyst may also be added any time during the ester interchange process.

It is theroized that lithium is reactive at a lower temperature in the ester interchange reaction and thus initiates the reaction between the LDE and the glycol at a lower temperature than the effective temperature range of manganese. Although Applicants do not wish to be bound by this theory, it is believed that the addition of the lithium to the manganese in the ester interchange stage increases the ester interchange rate thereby reducing the ester interchange time.

At the completion of the ester interchange process, it is generally preferred to sequester the manganese such that it is ineffective and is inert during the polycondensation reaction. The reactivity of manganese as a catalyst occurs at a higher temperature than that of lithium. Manganese has a very high reactivity in both the ester interchange reaction and the polycondensation reaction. However, it is generally preferred to sequester manganese at the end of the ester interchange process, otherwise manganese produces a polymer with bad color, the polymer has a broader molecular weight distribution, which is undesirable, and when manganese is active as a catalyst in the polycondensation stage, many by-products such as oxides, etc., are created, which discolor the resultant polymer.

The typical sequestering agent is a multivalent phosphorous. Thus, at the end of the ester interchange reaction or during the polycondensation reaction, a tri- or penta-valent phosphorous compound is usually added. Typical phosphorous compounds suitable as sequestering agents for the manganese are tributyl phosphate, polyphosphoric acid, triphenylphosphite, etc. It is believed that the phosphorous forms a complex with the manganese which is very stable and thus causes the manganese to be unavailable for catalytic activity during the polycondensation reaction. On the other hand, it is believed that phosphorous does not form a stable complex with the lithium, cobalt, nor antimony. Thus, each of these compounds would be reactive whenever conditions are achieved (such as temperature) that make them a catalyst for the production of PET.

It is noted that the phosphorous complex does not sequester 100 percent of the manganese. Thus in choosing the manganese level, it must be kept in mind that manganese yields bad color, undesirable by-products, and broad molecular weight distribution for the polymer formed. With the present invention, it is desirable to provide a balance between the manganese and lithium as the ester interchange catalyst such that the reactivity, reaction speed, and side reactions are controlled in a manner to produce a quality product. Accordingly, it is important that a sufficient amount of manganese be employed that will speed up the ester interchange reaction beyond that which can occur when only lithium is being employed, but, on the other hand, employing a sufficient amount of lithium to achieve good color of polymer, to avoid side reactions, and to achieve a narrower molecular weight distribution of the polymer, which are the benefits of the lithium catalyst. Moreover, the lithium catalyst is also active, because it has not been sequestered, during the polycondensation reaction and thus aids in reducing the overall polycondensation time over a reaction that uses antimony alone.

After the manganese has been sequestered, the polycondensation catalyst may be added. It is important that cobalt not be added during the ester interchange reaction because it has been determined that the catalyst system of cobalt, manganese, and lithium actually slows down the ester interchange reaction rate and increases the ester interchange time over that of a manganese and lithium catalyst system. Since the cobalt cannot be added until substantial completion of the ester interchange reaction, it would be convenient to add the cobalt with the sequestering agent or shortly after the addition of the sequestering agent. Likewise, the antimony may also be added at the time of addition of the sequestering agent or shortly thereafter with the cobalt.

On the other hand, the antimony catalyst may be added with the various raw material feedstock streams in the same manner as the ester interchange catalyst of manganese and lithium. Antimony is not effective during the ester interchange reaction because the temperature of the ester interchange reaction is lower than the reactivity temperature of the antimony for producing polyester resin. Thus, the antimony can be added any time before or during the polycondensation reaction.

At the end of the ester interchange reaction, the monomer is then subjected to a polycondensation reaction to yield PET and glycol. The polycondensation reaction occurs at a temperature range of between 250° C. to 310° C. at a vacuum pressure of approximately 0.1 to 3 mm of mercury. The reaction is reversible and, therefore, the glycol is continuously removed to force the completion of the reaction toward the production of PET. Between the ester interchange reaction and the polycondensation reaction, it is necessary to reduce the pressure from that of the ester interchange reaction to what is required for the polycondensation reaction. This period of time is typically called the vacuum let down time. It is preferred to add the polycondensation reaction catalyst of cobalt and antimony before the start of the vacuum let down in those situations where opening the reaction vessel for the introduction of the catalyst would break the vacuum, necessitating the initiation of the vacuum let down step once again.

It is theorized by Applicants that the lithium and cobalt are reactive at a lower temperature than antimony and thus catalyze the polycondensation reaction at an initial lower temperature than normally occurs with antimony alone. It is also theorized that the lithium and antimony increase the polycondensation rate and that the addition of between about 20 ppm and 40 ppm of cobalt, based upon the expected yield of the polyester, to the polycondensation reaction, further increases the polycondensation rate over that of lithium and antimony and thereby reduces the polycondensation time further than that achieved with lithium and antimony.

Generally, using an amount of any one of the catalysts which is outside the ranges of the present invention is not desirable. Using an amount less than about the minimum stated for any of the catalyst generally yields a result which is not as substantial as that obtained with the present invention. Using an amount more than about the maximum stated for any of the catalyst produces undersirable effects such as poor color, unwanted side products, high cost, etc.

EXPERIMENTAL PROCEDURE

Autoclave batches (roughly 1,000 grams of polymer were produced) were prepared in which all batches were run at approximately 2.1 to 1 mole ratio of ethylene glycol to DMT in a batch process. The autoclave was first charged with DMT, ethylene glycol and the various indicated catalyst. When the following experiments employed manganese, lithium, or cobalt, these metals were added in the form of acetates, and antimony was added in the form of oxide, with the amount of catalysts added being based upon the metals themselves. The autoclave was then heated to approximately 155° C. at atmospheric pressure where initiation of the ester interchange began. During charging of the raw materials, the autoclave was subjected to an inert gas (nitrogen at 4 standard cubic feet per hour) to aid in preventing oxidation. Generally, the autoclave was agitated with a stirrer to assure homogeneous commingling of the raw materials. At the start of the ester interchange reaction (approximately when the reactor contents reached 155° C.), the flow of nitrogen gas was terminated and the starting time was recorded. The autoclave temperature during ester interchange rose from approximately 155° C. to about 220° to 230° C. During the ester interchange the methanol was continuously removed to force the reaction toward the production of the monomer. At this point, the ester interchange reaction was substantially complete and polyvalent phosphorous (for example, tributylphosphate) was added to sequester the manganese. During the addition and mixing of the phosphorous compound the nitrogen gas was once again turned on.

After the phosphorous had been throughly and uniformly mixed with the monomer, the polycondensation catalysts were added in the amounts indicated. Vacuum let down was initiated and during this time the flow of nitrogen gas was once again terminated. During vacuum let down a vacuum is drawn on the autoclave until a vacuum of about 1.0 mm or lower of mercury is achieved. At the end of the vacuum let down, the autoclave was again heated to about 270° C. thereby initiating the polycondensation reaction. The polycondensation reaction proceeded until substantial completion, during which the glycol formed was removed. The polycondensation time was recorded.

Once the polyester was formed, the polymer was tested for intrinsic viscosity (IV), color, melting point, glass transition temperature, number of carboxyl end groups (CEG) expressed in micro equivalents per gram, the mole percent of diethylene glycol (DEG) present, and the presence of various catalytic components. The color test was ASTM Method E308-85 and measured luminescence (L*), yellow-blueness (b*), and red-greeness (a*) of the polymer. The IV was tested at 25° C. using a orthochlorophenol solvent in which 8 grams of the resin was mixed with 100 me of the solvent. The melting point and $T_g$ were determined by Differential Scanning Calorimetry.

THE EXAMPLE

Various catalyst systems were employed to demonstrate the present invention. In Experiment 1 (the control), manganese and antimony were employed at about 61 ppm manganese and 490 ppm antimony, based upon the expected yield of the polymer. The manganese was in the form of manganese acetate and the antimony was in the form of antimony oxide. The components were added as described previously under experimental conditions. At the end of ester interchange, 88 ppm of phosphorous was added.

Experiment 2 was similar to Experiment 1 but used a lesser amount of manganese (13 ppm) as the ester interchange catalyst and a slightly lesser amount of antimony (409 ppm) as the polycondensation catalyst. At the end of ester interchange, 88 ppm of phosphorous was added.

The third experiment used manganese and cobalt as the ester interchange catalyst and antimony as the polycondensation catalyst. The amount of manganese was 75 ppm, the amount of cobalt was 20 ppm and the amount of antimony was 328 ppm. The cobalt was added simultaneously with the manganese which were charged into the autoclave with the raw components. At the end of ester interchange, 90 ppm of phosphorous was added.

Experiment 4 employed the same catalyst system as Experiment 3 but the cobalt was added after the ester interchange process such that only the manganese used at 75 ppm was the ester interchange catalyst. Cobalt at 20 ppm and antimony at 328 ppm were employed as polycondensation catalysts. At the end of ester interchange 90 ppm of phosphorous was added to the autoclave.

Experiment 5 employed as the ester interchange catalyst manganese, lithium and cobalt all in the form of acetates, and specifically, 27 ppm of manganese, 144 ppm of lithium and 20 ppm of cobalt were employed. In the polycondensation stage, antimony in the amount of 376 ppm was added before the polycondensation stage. At the end of the ester interchange reaction 90 ppm of phosphorous was added.

In Experiment 6 manganese and lithium were added as the catalysts for the ester interchange reaction, while cobalt and antimony were added as the catalysts for the polycondensation stage. Specifically, 27 ppm of manganese and 144 ppm of lithium were added in the form of acetates, while 20 ppm of cobalt was added after ester interchange in the form of an acetate and 376 ppm of antimony was added in the form of an oxide. At the end of the ester interchange reaction 90 ppm of phosphorous was added.

The reaction times, IVs, melting points, $T_g$s, colorants, vacuum let down times, CEG, DEG, and amounts of catalysts were measured. The results of the Example are set forth in Table 1.

level. Most important, both the ester interchange time and the polycondensation time were drastically reduced. In comparing Experiment 6 with Experiment 5, it is obvious that the addition of cobalt as an ester interchange catalyst hinders the catalytic activity of manganese and lithium. Likewise, the improved polyconden-

TABLE 1

|  | Experiment 1 | Experiment 2 | Experiment 3 | Experiment 4 | Experiment 5 | Experiment 6 |
|---|---|---|---|---|---|---|
| Ester Interchange Catalyst | Mn | Mn | Mn/Co | Mn | Mn/Co/Li | Mn/Li |
| Polycondensation Catalyst | Sb | Sb | Sb | Co/Sb | Sb | Co/Sb |
| Ester Interchange Time (min) | 167 | 332 | 120 | 151 | 107 | 90 |
| Polycondensation Time (min) | 111 | 127 | 304 | 170 | 79 | 55 |
| Vacuum Let Down Time (min) | 44 | 58 | 61 | 54 | 56 | 45 |
| Total Ester Interchange and Polycondensation Time (min) | 278 | 459 | 424 | 321 | 186 | 145 |
| IV in deciliters/gm | .628 | .630 | .590 | .583 | .622 | .612 |
| Melt Point °C. | 255 | 252 | 255 | 254 | 254 | 256 |
| Tg °C. | 78.1 | 77.9 | 73.2 | 80.3 | 76.9 | — |
| Color |  |  |  |  |  |  |
| L* | 80.34 | 78.87 | 77.75 | 80.33 | 76.5 | 81.45 |
| a* | −1.72 | −1.86 | −2.27 | −1.51 | −0.46 | −0.71 |
| b* | 7.24 | 10.01 | 5.25 | 3.72 | +7.7 | 1.91 |
| CEG | 12.9 | 14.9 | 25.3 | 20.5 | 27.6 | 14.3 |
| DEG | 1.35 | 1.69 | 1.44 | 1.18 | 0.87 | 0.55 |
| Catalyst added |  |  |  |  |  |  |
| Mn ppm | 61 | 13 | 75 | 75 | 27 | 27 |
| Li ppm | — | — | — | — | 144 | 144 |
| Co ppm | — | — | 20 | 20 | 20 | 20 |
| Sb ppm | 490 | 409 | 328 | 328 | 376 | 376 |
| Phosphorous in Polycondensation | 88 | 88 | 90 | 90 | 90 | 90 |

Experiment 1 is the control and the ester interchange time is approximately 167 minutes, the polymerization time is approximately 111 minutes and the total of those times are 278 minutes when manganese is used as the ester interchange catalyst and antimony is used as the polycondensation catalyst. Experiment 2 demonstrates that reducing the manganese level drastically affects (increases) the ester interchange time.

Experiment 3 demonstrates that employing cobalt as an ester interchange catalyst does indeed affect the ester interchange time by reducing the time approximately 47 minutes. The polycondensation time increased because for this particular example the amount of antimony employed was 328 ppm compared with 490 ppm employed in Experiment 1. This experiment also demonstrates poor color when cobalt is an ester interchange catalyst, and higher CEG.

Experiment 4 used the same amount of cobalt, manganese and antimony as Experiment 3, however, the cobalt was employed as a polycondensation catalyst. While the ester interchange time is slightly less than the control, the polycondensation time is significantly higher than the control, but less than the polycondensation time of Experiment 3, demonstrating that cobalt is an effective polycondensation catalyst. Additionally, Experiment 4 produces a polymer with good color.

In Experiment 5, lithium, manganese, and cobalt were ester interchange catalyst, while only antimony was the polycondensation catalyst. Both the ester interchange time and polycondensation time for Experiment 5 were significantly better than the control. Because cobalt is an ester interchange catalyst, the color is poor and CEG is high. The addition of lithium results in low DEG's.

Experiment 6 employed as ester interchange catalysts manganese and lithium, while cobalt and antimony were employed as polycondensation catalysts. The amounts of catalyst were the same as employed in Experiment 5. Experiment 6 had excellent color properties, an acceptable CEG level, and excellent low DEG sation time obtained in Experiment 6 is a result of cobalt as a polycondensation catalyst.

Thus, it is apparent that there has been provided, in accordance with the invention, a catalyst system and a method of preparing polyester from a lower dialkyl ester of a dicarboxylic acid and glycol using the catalyst system that fully satisfies the objects, aims and advantages as set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations that fall within the sphere and scope of the invention.

That which is claimed:

1. In a process for making a polyester from a lower dialkyl ester of a dicarboxylic acid and glycol comprising the steps of:
   1. reacting a lower alkyl ester of a dicarboxylic acid and glycol by an ester interchange reaction to produce monomer and alcohol;
   2. removing said alcohol during said ester interchange reaction;
   3. polymerizing said monomer by a polycondensation reaction to produce said polyester and glycol; and
   4. removing said glycol during said polycondensation reaction;

wherein the improvement comprises: adding an effective catalytic amount of manganese and lithium before or during said ester interchange reaction to increase the ester interchange rate; and adding an effective catalytic amount of cobalt and antimony at the beginning of or during the polycondensation reaction, with the proviso that said cobalt not be added prior to substantial completion of said ester interchange reaction, to increase the polycondensation rate.

2. In the process of claim 1, wherein said manganese, lithium, cobalt, and antimony are salts.

3. In the process of claim 1, wherein said manganese, lithium, cobalt, and antimony are organic compounds or inorganic compounds.

4. In the process of claim 3, wherein said organic compounds are selected from the class of carboxylated metallic salts or metal amines.

5. In the process of claim 3, wherein said inorganic compounds are selected from the class of metal halides or metal compounds of Group IV.

6. In the process of claim 1, wherein said manganese, lithium, and cobalt are acetates and said antimony is an oxide.

7. In the process of claim 1, wherein said polyester is polyethylene terephthalate, said lower dialkyl ester is dimethyl terephthalate, and said glycol is ethylene glycol.

8. In the process of claim 1, wherein said ester interchange reaction reacts at a temperature range of from about 150° C. to about 250° C., and at about atmospheric pressure.

9. In the process of claim 8, wherein said polycondensation reaction reacts at a temperature range of from about 250° C. to about 310° C., and at a pressure of from about 0.1 to about 3.0 mm mercury vacuum.

10. In the process of claim 1, wherein said manganese is present in a range of from about 20 ppm to about 150 ppm, said cobalt is present in a range of from about 10 to about 40 ppm, and said antimony is present in a range of from about 200 ppm to about 400 ppm, wherein all amounts are based on the expected yield of said polyester.

11. In the process of claim 1, wherein said manganese is sequestered after said ester interchange reaction is substantially completed or during said polycondensation reaction by adding a sequestering agent.

12. A polyester made from the process of claim 1.

13. A polyester made from the process of claim 10.

14. A polyester made from the process of claim 11.

* * * * *